(12) United States Patent
Zhuang et al.

(10) Patent No.: US 10,648,816 B2
(45) Date of Patent: May 12, 2020

(54) DEVICE AND METHOD FOR INTEGRATED NAVIGATION BASED ON WIRELESS FINGERPRINTS AND MEMS SENSORS

(71) Applicant: SOUTHEAST UNIVERSITY, Jiangsu (CN)

(72) Inventors: Yuan Zhuang, Jiangsu (CN); Jun Yang, Jiangsu (CN); Longning Qi, Jiangsu (CN)

(73) Assignee: SOUTHEAST UNIVERSITY (CN)

( * ) Notice: Subject to any disclaimer, the term of this patent is extended or adjusted under 35 U.S.C. 154(b) by 0 days.

(21) Appl. No.: 15/536,615

(22) PCT Filed: Nov. 30, 2015

(86) PCT No.: PCT/CN2015/095944
§ 371 (c)(1),
(2) Date: Jun. 15, 2017

(87) PCT Pub. No.: WO2017/088196
PCT Pub. Date: Jun. 1, 2017

(65) Prior Publication Data
US 2018/0252528 A1  Sep. 6, 2018

(30) Foreign Application Priority Data
Nov. 24, 2015 (CN) .......................... 2015 1 0825298

(51) Int. Cl.
*G01C 21/16* (2006.01)
*G01S 5/02* (2010.01)
(Continued)

(52) U.S. Cl.
CPC ......... *G01C 21/165* (2013.01); *G01C 21/206* (2013.01); *G01S 5/02* (2013.01);
(Continued)

(58) Field of Classification Search
CPC ............ G01S 5/06; G01S 19/34; G01S 19/26; G06K 19/08; G08B 13/187; G01C 21/005
See application file for complete search history.

(56) References Cited

U.S. PATENT DOCUMENTS 7,119,687 B2 * 10/2006 Paulsen ..................... G01S 5/06
340/572.1
7,595,750 B2 * 9/2009 Monnerat ............... G01S 19/26
342/357.35
(Continued)

FOREIGN PATENT DOCUMENTS

CN     102494684     6/2012   ............. G01C 21/20
CN     103197279     7/2013   ............... G01S 5/00
(Continued)

OTHER PUBLICATIONS

International Search Report issued in corresponding PCT Application Serial No. PCT/CN2015/095944 dated Aug. 11, 2016 with English translation (8 pages).
(Continued)

*Primary Examiner* — Bernarr E Gregory
(74) *Attorney, Agent, or Firm* — Hayes Soloway PC

(57) ABSTRACT

An integration navigation device and method in which wireless signal strength data collecting and processing module obtains first position information of a target to be detected; a MEMS sensor data collecting and processing module obtains, according to state change information of the target to be detected, second position information of the target to be detected; a data integration module integrates the first position information and the second position information and feeds back the integrated result to the wireless signal strength data collecting and processing module and the MEMS sensor data collecting and processing module to perform data processing of the next moment.

18 Claims, 13 Drawing Sheets

(51) Int. Cl.
*G01C 21/20* (2006.01)
*H04W 4/021* (2018.01)
*H04W 84/06* (2009.01)
*G01C 21/00* (2006.01)
*G01S 5/00* (2006.01)

(52) U.S. Cl.
CPC .......... *G01S 5/0252* (2013.01); *G01S 5/0257* (2013.01); *H04W 4/021* (2013.01); *H04W 84/06* (2013.01)

(56) References Cited

U.S. PATENT DOCUMENTS

| | | | | |
|---|---|---|---|---|
| 8,203,487 B2* | 6/2012 | Hol | ....................... | G01S 5/0257 342/463 |
| 8,354,925 B1* | 1/2013 | Libby | .................. | G08B 13/187 340/506 |
| 8,957,812 B1* | 2/2015 | Hill | ....................... | G01S 5/0257 342/445 |
| 2006/0181394 A1* | 8/2006 | Clarke | ................... | G06K 19/08 340/10.4 |
| 2012/0326922 A1* | 12/2012 | Yang | ....................... | G01S 19/34 342/357.3 |
| 2015/0195682 A1 | 7/2015 | Lee | ......................... | H04W 4/04 |
| 2016/0139238 A1* | 5/2016 | Bekkali | ................. | G01S 5/0252 342/463 |

FOREIGN PATENT DOCUMENTS

| | | | | |
|---|---|---|---|---|
| CN | 104075711 | 10/2014 | ............. | G01C 21/00 |
| CN | 104333903 | 2/2015 | ............ | H04W 64/00 |
| CN | 104359480 | 2/2015 | ............ | G01C 21/16 |
| CN | 104535064 | 4/2015 | ............ | G01C 21/16 |
| KR | 101247795 | 3/2013 | ............... | G01S 5/02 |

OTHER PUBLICATIONS

Written Opinion of the International Search Authority issued in corresponding PCT Application Serial No. PCT/CN2015/095944 dated Aug. 24, 2016 (3 pages).

* cited by examiner

Time (Second)

Error (Meter)

DEVICE AND METHOD FOR INTEGRATED NAVIGATION BASED ON WIRELESS FINGERPRINTS AND MEMS SENSORS

I FIELD OF THE INVENTION

The invention relates to the field of wireless data transmission and positioning analysis, and particularly to a navigation device and method based on the integration of wireless fingerprints and MEMS sensors.

II BACKGROUND OF THE INVENTION

In the past ten years, the market of portable devices (for example, smart phones, tablets, and smart watches) has been developed at an ultra-high velocity. The portable equipment has been widely applied to human life, for example, short message, phone, navigation, game, website browsing, social media, etc. Currently, most of the portable devices have powerful processors, wireless transceivers, Global Navigation Satellite System (GNSS) receivers and many sensors. Due to their popularization and powerful hardware, these portable devices have become ideal platforms for navigation-related applications.

The GNSS receiver embedded in the portable device can provide an accurate positioning solution in an open sky environment, but it cannot work well in a severe environment such as urban canyons and indoors. In the challenging environments, other wireless techniques (for example, WiFi and BLUETOOTH® wireless technology standard) are usually used to replace or assist the GNSS receivers to provide the positioning solution. In these wireless positioning techniques, WiFi positioning only adopts the existing infrastructure, while BLUETOOTH® wireless technology standard positioning generally deploys BLUETOOTH® wireless technology standard Low Energy (BLE) beacons. These wireless positioning systems usually estimate the location of a target by various different, measurements, for example, Time Of Arrival (TOA), Time Difference Of Arrival (TDOA), Angle of Arrival (AOA) and Received Signal Strength (RSS). The wireless positioning system using TOA, TDOA and AOA is complex and expensive and has poor performance in a dynamic indoor environment. These systems also need special hardware, which makes them cannot be supported by the current mainstream portable devices. On the contrary, the RSS-based method has been widely applied to the indoor wireless positioning system and has been supported by the current portable devices.

RSS-based wireless positioning techniques can be classified into two categories: trilateration and fingerprinting (FP). Trilateration needs to know the position of the wireless access points (APs) as a priori information. Then, the RSS value is transformed into the distance between the target and the wireless AP through a wireless propagation model. Finally, the position of the target is estimated by adopting the least squares (LSQ) to the AP positions and the distances (between the target and the APs). On the other hand, the wireless positioning system based on fingerprinting includes two phases: wireless fingerprint database construction and real-time positioning. The wireless fingerprint database construction phase generates wireless fingerprints by measuring the position information and the corresponding RSS values at these measurement points, and stores these fingerprints to construct the wireless signal map database. The real-time positioning phase uses different methods to match the current RSS values with the fingerprints in the wireless signal map database to determine the position of the target. Generally, wireless fingerprinting provides a more accurate positioning solution than trilateration. However, it needs more labor and time costs to construct the database. In order to realize an accurate positioning solution, wireless fingerprinting is adopted in this patent.

The fingerprinting-based wireless positioning system usually has the following limitations: 1) it cannot provide complete navigation solution (three-dimensional position, velocity and attitude); 2) the system performance highly depends on APs, for example distribution and available quantity of APs; 3) almost none of these systems can provide smooth and continuous positioning solution with high sampling rate; 4) the wireless RSS value often fluctuates in a severe environment, which is usually caused by reflection, attenuation and shadowing. It is difficult for the wireless positioning standalone system based on fingerprinting to eliminate these limitations.

The relative navigation technique based on micro-electromechanical system (MEMS) sensors can potentially reduce limitations of these wireless positioning systems. The MEMS navigation system can provide a complete smooth navigation solution with high sampling rate. In addition, the MEMS navigation system is self-contained systems which cannot be affected by environments. Therefore, these MEMS navigation systems can further be used to fill in the positioning gap in a sparsely distributed wireless AP environment. However, due to noises of the MEMS sensors in the portable devices, these MEMS standalone navigation solution can be accurate only for a short term. Therefore, these MEMS navigation systems need wireless signals to limit their drifting. Due to the complementary property of the wireless fingerprinting and MEMS sensors, they are integrated to realize a more accurate and stable navigation solution.

Most of current existing integration methods use an integration filter to fuse the wireless fingerprint solution and MEMS navigation solution, the fusion result is only fed back to the MEMS sensor to limit the drifting. However, the fusion result is not fed back to wireless fingerprinting to improve its performance.

III CONTENTS OF THE INVENTION

Invention purpose: in order to overcome the shortages present in the existing technology, the invention provides a navigation device and method based on the integration of wireless fingerprints and MEMS sensors, to improve the navigation precision and accelerate the processing speed of the whole system.

Contents of the invention: in order to realize the above purpose, a navigation device based on the integration of wireless fingerprints and MEMS sensors, provided in the invention, includes: a wireless signal intensity data collecting and processing module, a sensor data collecting and processing module, a data integrated module and several wireless access points distributed in different positions; the wireless signal intensity data collecting and processing module obtains first position information of a target to be detected according to the wireless signal intensity information between the target to be detected and the wireless access points, the sensor data collecting and processing module obtains second position information of the target to be detected according to state change information of the target to be detected, and the data integrated module fuses the first position information and the second position information to obtain final position information of the target to be detected according to a fused result, and feeds hack the fused result to the wireless signal intensity data collecting and processing module and the sensor data collecting and processing module.

Wherein, the wireless signal intensity data collecting and processing module includes: a wireless signal intensity data collecting unit, a wireless signal map database, a data searching determining unit and a data matching unit; the wireless signal intensity data collecting unit receives wireless signal intensity information between the target to be detected and wireless access points; the wireless signal map database provides a wireless signal map database for the data searching determining unit; the data searching determining unit selects the fingerprint search area for the data matching unit according to the wireless signal intensity information transmitted by the wireless signal intensity data collecting unit and the fused result of the previous moment fed back by the data integrated module; and the data matching unit performs fingerprint matching to the wireless signal intensity information of the target to be detected in the range of fingerprint searching to obtain first position information of the target to be detected at the current moment. For ease of description of the later experiment, the fingerprinting improved herein is referred to as constrained fingerprinting (CFP).

Further, the wireless signal intensity data collecting unit includes: a wireless signal intensity data receiving unit and a wireless signal intensity data preprocessing unit; the wireless signal intensity data receiving unit receives wireless signal intensity information between the target to be detected and the wireless access points and transmits the information to the wireless signal intensity data preprocessing unit, and the wireless signal intensity data preprocessing unit performs noise elimination to the wireless signal intensity information.

Wherein, the data searching determining unit includes a searching center determining module and a search area determining module; the searching center determining module determines the center of the basic search area according to the wireless signal intensity data collecting unit, and the wireless signal intensity information and the center is taken as the center for expanding the search area according to the integrated result of the previous moment fed back by the data integrated module; the search area determining module takes the center of the basic search area as the geometric center and determines the basic search area according to the preset searching shape, takes the center of the expanded search area as the geometric center and determines the expanded search area according to the preset searching shape, and then combines the basic search area and the expanded search area according to the preset combining mode to obtain the fingerprint search area of the current moment.

Wherein, the sensor data collecting and processing module includes: a sensor data collecting unit and a sensor data processing unit; the sensor data collecting unit collects state change information of the target to be detected, and the sensor data processing unit calculates second position information of the target to be detected according to the state change information.

Wherein, the data integrated module includes: an integration filter and a smooth filter; the smooth filter performs smoothing processing to the first position information of the target to be detected and then transmits it to the integration filter; and the improved fingerprinting is subjected to smoothing in the invention. For ease of later description, the constrained fingerprinting after being smoothed is referred to as smoothed constrained fingerprinting (SCFP). The integration filter fuses the smoothed first position information and the second position information of the target to be detected to obtain final position information of the target to be detected.

Correspondingly, the invention further provides a navigation method based on the integration of wireless fingerprints and MEMS sensors, including the following steps:

the wireless signal intensity data collecting and processing module obtains first position information of a target to be detected according to wireless signal intensity information between the target to be detected and wireless access points;

the sensor data collecting and processing module obtains second position information of the target to be detected according to state change information of the target to be detected;

the data integrated module fuses the first position information and the second position information of the target to be detected to obtain final position information of the target to be detected according to the fused result, and feeds back the fused result to the wireless signal intensity data collecting and processing module and the sensor data collecting and processing module.

Further, the wireless signal intensity data collecting and processing module obtains the first position information of the target to be detected, which includes the following steps:

performing position information sampling in a positioning region, generating and storing wireless fingerprints from position information of a sampling point and the wireless signal intensity information between the sampling point and the wireless access points, and constructing a wireless signal map database using the wireless fingerprints;

taking the wireless signal intensity information between the target to be detected and the wireless access points as the center, determining the basic search area at the current moment by a preset searching shape, taking the fused result of the previous moment as the center of the expanded search area, determining the expanded search area at the current moment by the preset searching shape, and then combining the basic search area and the expanded search area according to the preset combining mode to obtain the fingerprint search area at the current moment;

performing fingerprint matching to the wireless signal intensity information of the target to be detected in the fingerprint search area to obtain the first position information of the target to be detected at the current moment.

Beneficial effects: a navigation device and method based on the integration of wireless fingerprints and MEMS sensors of the invention, uses the data integrated module to fuse the position information obtained respectively by the wireless signal intensity data collecting and processing module and the sensor data collecting and processing module, the wireless signal intensity data collecting and processing module uses the fingerprint search area determined by the fused result to obtain position information, and the obtained position information colligates the results obtained at the current moment and the previous moment, thereby improves positioning accuracy.

IV DESCRIPTION OF THE DRAWINGS

V EMBODIMENTS

Hereunder the present invention will be detailed in conjunction with an embodiment.

Figure 1:
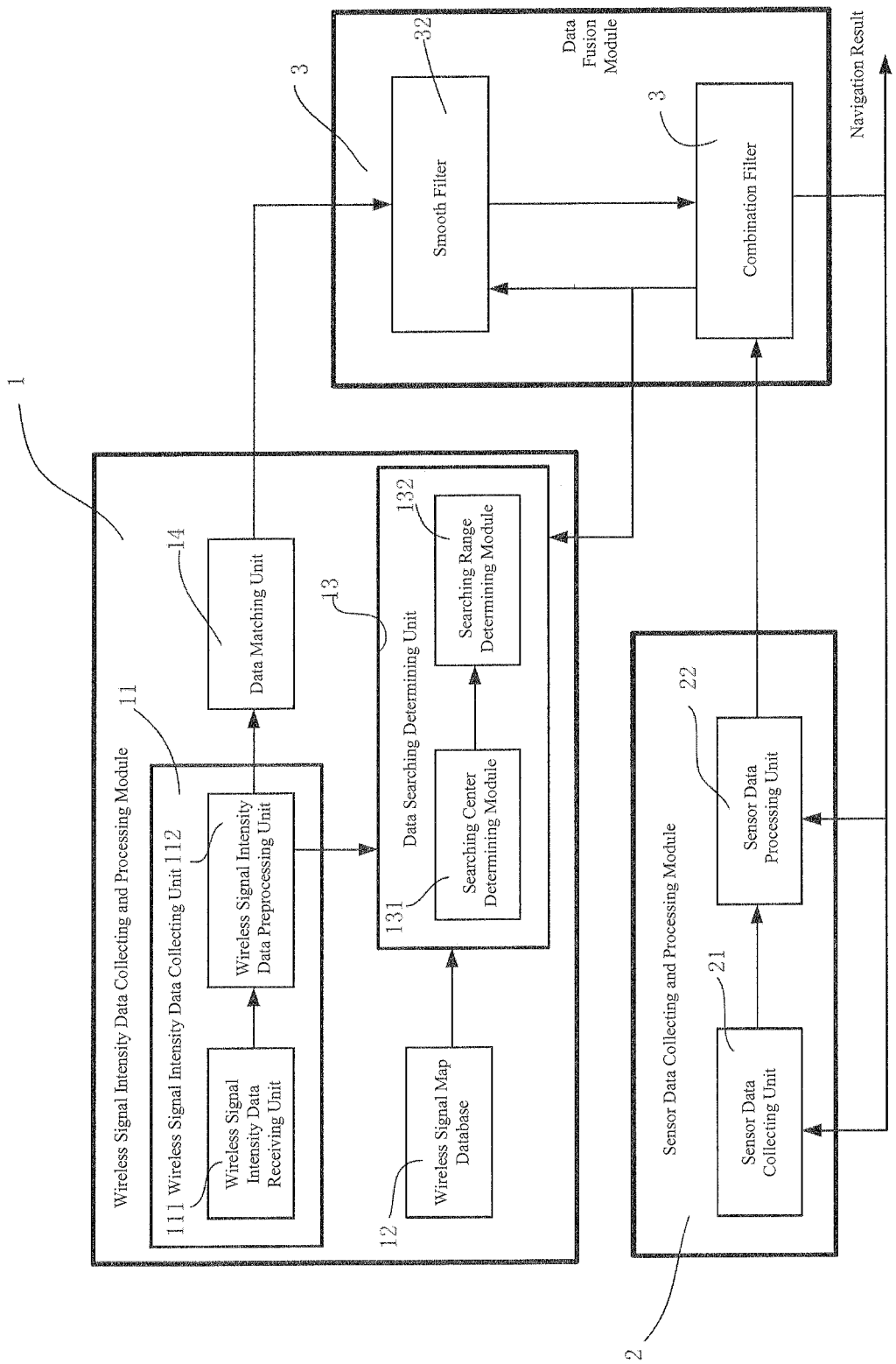
FIG. 1 shows a structural schematic diagram of a navigation device and method based on the integration of wireless fingerprints and MEMS sensors of the invention.

The navigation device and method based on the integration of wireless fingerprints and MEMS sensors in FIG. 1 includes: a wireless signal intensity data collecting and processing module 1, a sensor data collecting and processing module 2, and a data integrated module 3; the wireless signal intensity data collecting and processing module 1 cooperates with several wireless access points distributed in different positions to obtain first position information of a target to be detected according to the wireless signal intensity information between the target to be detected and the wireless access points, the sensor data collecting and processing module 2 obtains second position information of the target to be detected according to state change information of the target to be detected, the state change information refers to acceleration and/or angular velocity information of the target to be detected, the data integrated module 3 fuses the first position information and the second position information to obtain final position information of the target to be detected according to a fusion result, and feeds back the fusion result to the wireless signal intensity data collecting and processing module 1 and the sensor data collecting and processing module 2, the wireless signal intensity data collecting and processing module 1 and the sensor data collecting and processing module 2 performs calculation of the position information of the next moment according to the feedback information respectively. The above integrated navigation device can be applied to single portable device, or by taking the portable device as a carrier (for example, pedestrian, robot and vehicle), can be hand held or fixed on the carrier.

The above wireless signal intensity data collecting and processing module 1 of FIG. 1 includes: a wireless signal intensity data collecting unit 11, a wireless signal map database 12, a data searching determining unit 13 and a data matching unit 14; the target to be detected receives a wireless signal transmitted by wireless access points and transmits the wireless received signal strength (RSS) to the wireless signal intensity data collecting and processing module 1, the wireless signal intensity data collecting unit 11 receives the RSS value; the wireless signal map database 12 is a pre-formed wireless signal map database, and is built by using the stored wireless fingerprints according to the position information of the sampling point in the positioning region and wireless fingerprints generated by the corresponding RSS value, the wireless signal map database 12 provides fingerprint information in the positioning region for the data searching determining unit 13; the data searching determining unit 13 selects an appropriate fingerprint search area for the data matching unit 14 according to the RSS value of the target to be detected and the feedback information of the data integrated module 3; the data matching unit 14 performs fingerprint matching to the RSS value of the target to be detected in the fingerprint search area to obtain first position information of the target to be detected, denoted as constrained fingerprint solution. The above positioning region is determined by the layout of the sampling point and range of the sampling point, indicating the range that the system can position.

The above wireless signal intensity data collecting unit 11 includes: a wireless signal intensity data receiving unit 111 and a wireless signal intensity data preprocessing unit 112, the RSS value of the target to be detected is received by the wireless signal intensity data receiving unit 111 and is transmitted to the wireless signal intensity data preprocessing unit 112, the wireless signal intensity data preprocessing unit 112 preprocesses the RSS value to eliminate noise existed due to fluctuations thereof, the preprocessing method can eliminate undesirable RSS values by using methods such as selecting, filtering or smoothing. The wireless signal intensity data preprocessing unit 112 outputs the preprocessed RSS value.

It is important for the whole system to determine the data search area, if the system has not selected the appropriate search area, it may cause that the fingerprint matching of the data matching unit 14 searches fingerprints of the whole wireless map database or fingerprints of the incorrect search area; for the whole wireless map database, the wireless fingerprinting recognition result may have several jump points, and the processing speed is slow; for the incorrect search area, the processing speed may be fast, but the fingerprinting recognition result may be far away from the correct position.

The above data searching determining unit 13 of the invention includes a searching center determining module 131 and a search area determining module 132. The searching center determining module 131 calculates the center of the basic search area A according to the RSS value of the target to be detected collected by the wireless signal intensity data collecting unit 11, and at the same time calculates the center of the expanded search area 13 according to the fused result fed back by the data integrated module 3 at the previous moment. The search area determining module 132 takes the center of the basic search area A as the geometric center and determines the basic search area according to the preset searching shape, takes the center of the expanded search area B as the geometric center and determines the expanded search area according to the preset searching shape, and then combines the basic search area A and the expanded search area B according to the preset combining mode to obtain the fingerprint search area at the current moment.

The fingerprint search area at the current moment is about around the position of the fusion result of the previous moment. Due to uncertainty of the position of covariance matrix of the integration filter, the fusion result of the previous moment can be combined so that the center and range of the fingerprint search area at the current moment is more accurate. Therefore, the expanded search area B from the fingerprint integrated solution may be in different shapes (for example, rectangular, circular and oval) distributed around the basic searching rang A, and the searching size is determined by uncertainty of the position. In the invention, union combination is performed to the expanded search area B and the basic search area A, so that union combination is performed to the two search areas such that the probability that the most matching fingerprint is selected is high no matter the expanded search area B is close to the basic search area A or there is big difference between the expanded search area B and the basic search area A.

The above searching center determining module 131 calculates the center of the basic search area A according to the RSS value of the target to be detected collected by the wireless signal intensity data collecting unit 11, and the details are as follows:

Assuming the RSS value of the target to be detected to a vector $RSS=[RSS_1\ RSS_2\ \ldots\ RSS_k]^T$ from k wireless access points AP, the possible search area of the fingerprints is around the weighted average value $l_0$ of the position of the k wireless access points AP, which is shown as follows:

$$l_0 = \sum_{i=1}^{k} \omega_i \cdot 1_{APi} \quad (1)$$

In the formula, $1_{APi}$ is the position of the $i^{th}$ wireless access point AP, $\omega_i$ is the weight of the position of the $i^{th}$ wireless access point AP, and the definition formula is as follows:

$$\omega_i = \frac{\frac{1}{RSS_i}}{\sum_{i=1}^{k} \frac{1}{RSS_i}} \quad (2)$$

According to the real-time wireless RSS value, the fingerprint search area A may be different shapes (for example, rectangular, circular and oval) distributed around the $l_0$. $l_0$ is the center of the basic search area A.

The above search area determining module 132 determines the fingerprint search area at the current moment according to the center $l_0$ of the basic search area A, the center lint of the expanded search area B and the preset searching shape. The preset searching shape of the invention may be rectangular, circular or oval.

(1) The preset searching shape is rectangular, the length and width are preset, and determining the search area is specifically as follows:

For the basic search area A, the center position of the rectangle is $l_0$. The length and width of the rectangle may be preset to a fixed value $d_0$, e.g., $d_0=15$ meters, and may be assumed to an adaptive value $C_1 d_0$, where $C_1$ is an adaptive parameter that is in negative correlation with the maximum value of RSS max(RSS); when max(RSS) increases, $C_1$ will decrease, and vice versa $C_1$ increase. The adaptive search area of the basic search area A depends on the fact that a larger search area is needed when the RSS value is low and there's much noise. The rectangular basic search area A is defined as follows:

$$\begin{cases} |r_{FP}(1) - l_0(1)| \le C_1 \cdot d_0 \\ |r_{FP}(2) - l_0(2)| \le C_1 \cdot d_0 \end{cases} \quad (3)$$

wherein, $r_{FP}$ is the fingerprint three-dimensional position coordinates in the wireless signal map database, while in this embodiment it is planar positioning, and thus it only presents two-dimensional coordinate. Any fingerprints in the wireless signal map database that satisfy the formula (3) are selected for the basic search area A.

The expanded search area B, its center position is assumed to $l_{into}$. The length and width of the rectangle may be preset to a fixed value $d_0$, e.g., $d_0=15$ meters, and also may be set to an adaptive value $C_2 \cdot \sigma_e$ and $C_2 \cdot \sigma_n$, where $\sigma_e$ and $\sigma_n$ are respectively position standard deviations in the east and north directions, and $C_2$ is an adaptive parameter that is in negative correlation with the maximum value of RSS max(RSS). When max(RSS) increases, $C_2$ will decrease, and vice versa $C_2$ increase. The rectangular expanded search area B is defined as follows:

$$\begin{cases} |r_{FP}(1) - l_{int}(1)| \le C_2 \cdot \sigma_e \\ |r_{FP}(2) - l_{int}(2)| \le C_2 \cdot \sigma_n \end{cases} \quad (4)$$

Any fingerprints in the wireless signal map database that satisfy the formula (4) are selected for the expanded search area B.

The fingerprints that satisfy the formula (3) and the formula (4) constitute the fingerprint search area based on rectangle, i.e., union of the basic search area A and the expanded search area B.

(2) The preset searching shape is circular, the radius thereof is preset, and determining the search area is specifically as follows:

For the basic search area A, the center position of the circle is $l_0$, the radius may be set to a fixed value $d_0$, or an adaptive value $C_1 d_0$, and the circular basic search area A is defined as follows:

$$\sqrt{(r_{FP}(1)-l_0(1))^2 + (r_{FP}(2)-l_0(2))^2} \le C_1 \cdot d_0 \quad (5)$$

For the expanded search area B, $l_{int}$ is the center position of the circle. The radius of the circle may be set to a fixed value $d_0$, or an adaptive value $C_2\sqrt{\sigma_e^2+\sigma_n^2}$, where $\sigma_e$ and $\sigma_n$ are respectively position standard deviations in the east and north directions, and $C_2$ is an adaptive parameter that is in negative correlation with the maximum value of RSS max (RSS). The circular expanded search area B is defined as follows:

$$\sqrt{(r_{FP}(1)-l_{int}(1))^2 + (r_{FP}(2)-l_{int}(2))^2} \le C_2 \cdot \sqrt{\sigma_e^2+\sigma_n^2} \quad (6)$$

Any fingerprints that satisfy the formula (6) are selected for the expanded search area B. The fingerprints that finally satisfy the formula (5) and the formula (6) constitute the fingerprint search area based on circle, i.e., union of the basic search area A and the expanded search area B.

(3) The preset searching shape is oval, the main axis and the secondary axis of the oval are preset to determine search area, specifically as follows:

The oval central position of the basic search area A is $l_0$. The main axis and the secondary axis of the oval may be set to a fixed value $d_0$, or an adaptive value $C_1 d_0$. The oval basic search area A is defined as follows:

$$\sqrt{\left(\frac{r_{FP}(1) - l_0(1)}{C_1 \cdot d_0}\right)^2 + \left(\frac{r_{FP}(2) - l_0(2)}{C_1 \cdot d_0}\right)^2} \leq 1 \quad (7)$$

wherein, $r_{FP}$ is the fingerprint three-dimensional position coordinate in the wireless signal map database. For the expanded search area B, $l_{int}$ is the center position of the oval. The main axis and the secondary axis of the oval may be set to a fixed value $d_0$, or adaptive values $C_2 \sigma_e$ and $C_2 \sigma_n$, where $\sigma_e$ and $\sigma_n$ are respectively position standard deviations in the east and north directions, and $C_2$ is an adaptive parameter that is in negative correlation with the maximum value of RSS max(RSS). The oval expanded search area B is defined as follows:

$$\sqrt{\left(\frac{r_{FP}(1) - l_{int}(1)}{C_1 \cdot \sigma_e}\right)^2 + \left(\frac{r_{FP}(2) - l_{int}(2)}{C_1 \cdot \sigma_n}\right)^2} \leq 1 \quad (8)$$

The fingerprints that finally satisfy the formula (7) and the formula (8) constitute the fingerprint search area based on oval, i.e., union of the basic search area A and the expanded search area B.

After determining the fingerprint search area, wireless fingerprints matching is used to select the most matched fingerprints from the search area and to estimate the position of the target. The wireless fingerprints matching algorithm may be implemented in various different ways. According to the amount of the measured RSS vectors for matching, these algorithms may be classified into single-point matching and multi-point matching. The single-point matching only measures one RSS vector to match the fingerprint, while the multi-point matching measures a plurality of RSS vectors to match the fingerprints. These algorithms may also be classified into deterministic matching and probabilistic matching in accordance with whether the position of the estimated target is assumed to be a random vector. The deterministic matching assumes that the position of the estimated target is a non-random vector, while the probabilistic matching assumes the position is a random vector. Further, the above data matching unit 14 performs fingerprint matching to the RSS value of the target to be detected in the fingerprint search area to obtain the first position information of the target to be detected. Fingerprint matching of the invention may use the following wireless fingerprint matching algorithms: (1) single-point deterministic matching; (2) single-point probabilistic matching; (3) multi-point deterministic matching; and (4) multi-point probabilistic matching.

a. Single-Point Deterministic Matching

The single-point deterministic matching uses fingerprints in the determined search area to calculate the norm of the RSS information obtained by measuring a single RSS vector.

Then, K fingerprints with minimum norms are selected to estimate the position of the target. The position of the target is calculated through weighted average of the position of the selected fingerprints. The weight is determined by reciprocal of the norm of the RSS value. The method is also referred to as K-nearest neighbor (KNN). The corresponding calculation formula is as follows:

$$r_{CFP} = \sum_{i=1}^{N} \frac{\omega_i}{\sum_{j=1}^{N} \omega_j} r_i \quad (9)$$

$$\omega_i = \frac{1}{\|RSS - RSS_i\|} \quad (10)$$

wherein, $r_{CFP}$ is the estimated position of the target, $r_i$ is the position of the $i^{th}$ fingerprint, $\omega_i$ is the weight corresponding to the $i^{th}$ fingerprint, RSS is the measured single RSS vector, $RSS_i$ is the RSS vector of the $i^{th}$ fingerprint, and N is the total number of the selected fingerprints. The norm $\|\cdot\|$ is arbitrary and can be realized by different methods, for example, p norm, modified p norm, Mahalanobis norm and the like. In all these methods, Euclidean norm (2-norm) and Mahalanobis norm are most widely used, and are defined as follows respectively:

$$2\text{-norm}: \|x\|_2 = \sqrt{\sum_{i=1}^{Nx} |x_i|^2} \quad (11)$$

and $$\text{Mahalanobis norm}: \|x\|_M = \sqrt{x^T P^{-1} x} \quad (12)$$

wherein, P is a covariance matrix of the fingerprints.

b. Single-Point Probabilistic Matching

The fingerprint matching may also be realized as single-point probabilistic matching, the position of the target is assumed to be a random vector and only one measured RSS vector is used for matching. The method may be considered as a probability problem. The goal of the probability problem is to estimate the optimal solution for the position of the target according to the conditional probability density function with the given measured RSS vector. The key part of the probabilistic matching is calculation of likelihood and estimation of probability density distance. Calculation of likelihood has various methods, such as Gaussian likelihood, histogram likelihood, kernel density likelihood, log-normal likelihood and exponential likelihood. The probability density distance estimation may be implemented by methods such as Lissack-Fu (LF), infinite norm, Kullback-Leibler, Bhattacharayya and Simandl and the like. Furthermore, three optimality criteria have been widely used for fingerprints matching: (1) maximization of likelihood density, (2) minimization of mean square error and (3) maximization of posterior density. The corresponding optimal estimators are as follows: (1) maximum likelihood (ML) estimator; (2) minimum mean square error (MMSE) estimator; and (3) maximum posteriori (MAP) estimator. Here, take the maximum likelihood estimator as an example, the estimator finds the position of the target by maximizing the likelihood density function, and the method is as follows:

$$\hat{p}_{ML} = \arg\max_p f(r|p) \quad (13)$$

wherein, $f(r|p)$ is the likelihood density. ML estimator selects the fingerprint position as estimation of the position of the target according to the maximum likelihood density.

If the fingerprints are sparsely distributed, the positioning precision is limited by that only one fingerprint is selected as estimation of the position. In order to improve the positioning precision, we can further average (or weighted-average) K fingerprints with maximum likelihood density and calculate estimation of the position using KNN. The single-point probabilistic matching selects K neighbors for KNN by the ML estimator, while K neighbors are selected by the norms of the RSS innovation in the single-point deterministic matching.

c. Multi-Point Deterministic Matching

Sometimes, due to the fluctuation of wireless RSS values, the mismatch rate of single-point matching is high. In order to reduce the mismatch rate, a plurality of measured RSS vectors may be combined to match fingerprints of the wireless signal map database. Generally, the multi-point matching is more accurate than the single-point matching. However, it needs a larger calculation load. Similar to the single-point matching, the multi-point matching may also be classified into two categories: deterministic methods and probabilistic methods. The single-point deterministic matching which is similar to the multi-point deterministic matching determines the position of the target through KNN and determines K fingerprints according to the reciprocal of the norm of the RSS innovation. The only difference is that, the norm is now calculated from a plurality of points. Some mathematical methods can also be applied to multi-point matching, such as, dynamic time warping (DTW).

d. Multi-Point Probabilistic Matching

The multi-point matching can also be implemented by a probabilistic method, i.e., the position of the target is assumed to be a random vector, and a plurality of RSS observation vectors is used for matching. The goal of the probability problem is to estimate the optimal solution for the position of the target front the joint condition probability density function with given observation RSS vectors. The method for likelihood calculation and probability density estimation is similar to single-point probabilistic matching. Similarly, the ML estimator, the MMSE estimator, the MAP estimator and KNN algorithm can be used for multi-point probabilistic matching.

There might be a plurality of the above wireless signal intensity data collecting and processing modules 1, respectively corresponding to different wireless signals. Accordingly, the target to be detected needs to support a plurality of wireless transceivers. The RSS value calculated by the corresponding wireless access points is reported to the corresponding wireless signal intensity data collecting and processing module 1 through different wireless networks. For example, the wireless fingerprints and a MEMS sensor based integrated navigation device includes two wireless signal intensity data collecting and processing modules 1, one wireless signal intensity data collecting and processing module 1 receives the RSS value transmitted by the target to be detected through the network and obtains the corresponding wireless fingerprint matching result, and the other wireless signal intensity data collecting and processing module 1 receives the RSS value transmitted by the target to be detected through BLUETOOTH® wireless technology standard and obtains the corresponding wireless fingerprint matching result; and the position information obtained by matching the two fingerprints are averaged to obtain the final wireless fingerprint matching result, i.e., CFP value.

The above sensor data collecting and processing module 2 includes: a sensor data collecting unit 21 and a sensor data processing unit 22; the sensor data collecting unit 21 collects state change information such as acceleration, angular velocity and the like of the target to be detected; and the sensor data processing unit 22 calculates the position, velocity and attitude (collectively referred to as second position information of the target to be detected) of the target according to the state change information. The state information of the target to be detected can be obtained by a 3-axis accelerometer and a 3-axis gyroscope sensor disposed on the target to be detected. The state data collecting and processing module 2 can use a common micro-electromechanical system (MEMS) module. The MEMS-based navigation system has various implementation solutions, for example, inertial navigation system (INS), pedestrian dead reckoning (PDR) and motion constraints (MC). The INS mechanization calculates the position, the velocity and the attitude of the target by using data of the 3-axis accelerometer and the 3-axis gyroscope; the PDR estimates the position and moving direction of a person by using the data of the accelerometer and the gyroscope according to the moving mode of the person; and the MC performs motion detection (i.e., moving and rest) and constraint by using the data of the accelerometers and the gyroscopes, which can further increase performance of INS or PDR. The sensor data collecting unit 21 can further collect data of other sensors such as a 3-axis magnetometer and a barometer, the moving direction of the target is estimated by means of cooperation of magnetometer and the gyroscope. The barometer can be used to estimate the height of the target. Thus, the state data required to be collected by the sensor data collecting unit 21 can be preset as required, and the corresponding sensor can be disposed on the target to be detected, so as to further assist INS or PDR to improve the navigation performance.

The above data integrated module 3 includes: an integration filter 31 and a smooth filter 32. The smooth filter 32 is used to perform smoothing to the first position information (CFP value) of the target to be detected obtained by the wireless signal intensity data processing module 1, and then transmit the smoothed CFP value to the integration filter 31. The integration filter 31 is used to fuse the smoothed CFP value and the second position information of the target to be detected obtained by the sensor data collecting and processing module 2 to obtain the final position information of the target to be detected.

The above integration filter 31 can be preset as statistical required and can se an extended Kalman filter (EKF), an unscented Kalman filter (UKF) or a particle filter (PF).

a. Extended Kalman Filter

If Gaussian statistics are used, EKF may be adopted. 15-element state error vector of EKF at K moment may be represented as:

$$\delta x_{k,k} = \delta x_k = [\delta r_k \ \delta v_k \ \delta \varphi_k \ b_k \ d_k] \quad (14)$$

$\delta_k$, $\delta v_k$ and $\delta \varphi_k$ are respectively position, velocity and attitude error. $b_k$ and $d_k$ are acceleration deviation and gyroscope drifts. EKF linearizes the nonlinear system model for integration, and the linearized model is as follows:

$$\delta x_{k+1|k} = \Phi_{k,k+1} \delta x_{k|k} + \omega_k \quad (15)$$

wherein, $\delta x_{k+1|k}$ is the error state prediction, $\delta x_{k|k}$ error state at the previous K moment, $\omega_k$ is the process noise, whose covariance matrix $Q_k = E(\omega_k \omega_k^T)$, $\Phi_{k,k+1}$ is a 15×15 transfer matrix:

$$\Phi_{k,k+1} = \begin{bmatrix} I & I \cdot dt & 0 & 0 & 0 \\ 0 & I & -S(a_k^n) \cdot \Delta t & C_{b,I}^n \cdot \Delta t & 0 \\ 0 & J \cdot \Delta t & I & 0 & C_{b,I}^n \cdot \Delta t \\ 0 & 0 & 0 & I & 0 \\ 0 & 0 & 0 & 0 & I \end{bmatrix} \quad (16)$$

wherein, $\Delta t$: is the difference between two moments. $a_k^n$ is bias-corrected acceleration vector in the navigation frame;

$$a_k^n = C_{b_{k+1}|k}^n \cdot a_k^b = [a_x, a_y, a_z,]^T \quad (17)$$

$S(a_k^n)$ is a skew symmetric matrix of $a_k^n$;

$$S(a_k^n) = \begin{bmatrix} 0 & -a_{z_b} & a_{y_b} \\ a_{z_b} & 0 & -a_{x_b} \\ -a_{y_b} & a_{y_b} & 0 \end{bmatrix} \quad (18)$$

wherein, J is given as follows:

$$J = \begin{bmatrix} -\frac{1}{R+h} & 0 & 0 \\ 0 & \frac{1}{R+h} & 0 \\ 0 & 0 & \frac{\tan\varphi}{R+h} \end{bmatrix} \quad (19)$$

wherein, R is the earth radius, h is the height, and $\varphi$ is the latitude. The measurement model in the EKF is as follows:

$$z_k = H_k \delta x_{k|k} + v_k \quad (20)$$

wherein, $Z_k$ is the measurement error vector, and $v_k$ is the measurement noise, whose covariance matrix is $R_k = E(v_k v_k^T)$. $H_k$ is a parameter matrix and is defined as follows:

$$H_k = [I_{3 \cdot 3} \ 0_{3 \cdot 12}] \quad (21)$$

Finally, the equation (29) and equation (30) are used to estimate the state error vector. The state error vector is used to update the current integrated navigation solution. The integrated navigation solution will provide the navigation information, for example, position and velocity as well as variance thereof for wireless fingerprinting and smooth filter. The whole solution is a stable closed loop.

b. Other Filters

Unscented Kalman filter (UKF) assumes that the system has Gaussian error, and the selected point complies with Gaussian distribution. Compared with EKF, the advantage of UKF is to approximate the mean and covariance parameter by using the points. The estimated mean and covariance are better than those of EKF, especially for a high nonlinear system.

If the system error is non-Gaussian, the integration filter 31 may use the particle filter (PF). PF adopts recursive Bayesian estimation based on Monte Carlo Simulation. In the PF implementation, many particles with weights are produced to represent the condition probability intensity function. These particles are propagated through the system model. In the non-Gaussian error system, the performance of PF is better than that of UKF and EKE However, the quantity of the particles is huge, and thus PF has a large calculation load. The smooth filter 32 is used to smooth the solution of constrained fingerprinting (CFP) obtained by the distance data processing module 1. Since the CFP solution is not smooth and has some hop points, the smooth filter 32 is further used to improve the precision of the whole system. The smooth filter 32 may use the Kalman filter (KF) or the adaptive Kalman filter (AKF). The AKF will adaptively adjust the parameter of the filter according to the navigation solution.

a. KF Filter

The KF filter may be applied to realize the smooth filter. The state vector of KF is defined as follows:

$$x = [r_e \ r_n \ v_e \ v_n]^T \quad (22)$$

wherein, $r_e$ and $r_n$ are two-dimensional position components (for example, east and north) in the horizontal plane, $v_e$ and $v_n$ are corresponding two-dimensional velocity components. The smooth filter works in a two-dimensional mode. The KF system model uses a classic kinematic model and is defined as follows:

$$x_{k+1|k} = \Phi_{k,k+1} x_{k|k} + \omega_k \quad (23)$$

wherein, $x_{k+1|k}$ is the predicted state vector, $x_{k|k}$ is the previous state vector at the k moment, and is a 4×4 transfer matrix:

$$\Phi_{k,k+1} = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix} \quad (24)$$

wherein, $\Delta t$ is the time difference between two moments. $\omega_k$ is the process noise of covariance matrix: $Q_k = E(\omega_k \omega_k^T)$ and is defined as follows:

$$\omega_k = [0 \ 0 \ \omega_{e,k} \ \omega_{n,k}]^T \quad (25)$$

wherein $\overline{\omega}_{e,k}$ and $\overline{\omega}_{n,k}$ are velocity noises in east and north directions at the k moment, and model building is implemented in random walk.

$$\begin{cases} \overline{\omega}_{e,k} = \overline{\omega}_{e,k-1} + n_e \cdot \Delta t \\ \overline{\omega}_{n,k} = \overline{\omega}_{n,k-1} + n_n \cdot \Delta t \end{cases} \quad (26)$$

wherein, $\overline{\omega}_{e,k-1}$ and $\overline{\omega}_{n,k-1}$ are velocity noises in east and north directions at k−1 moment, $n_e$ and $n_n$ are two Gaussian white noises, and $\Delta t$ is the time difference between the two moments.

The CFP solution is used as the measurements for the smooth KF, and the measurement model is defined as follows:

$$z_k = H_k x_{k|k} + v_k \quad (27)$$

wherein, takes the two-dimensional coordinate of the CFP solution as the measurement vector. $H_k$ is a decision matrix and is defined as follows:

$$H_k = \begin{bmatrix} 1 & 0 & 0 & 0 \\ 0 & 1 & 0 & 0 \end{bmatrix} \quad (28)$$

$v_k$ is the measurement noise and takes Gaussian white noise as the model, whose covariance matrix is $R_k = E(v_k v_k^T)$. KF process has two phases: prediction and updating.

In the prediction process, the state vector and the covariance matrix are predicted from the system model.

$$\begin{cases} x_{k+1|k} = \Phi_{k,k+1} x_{k|k} \\ P_{k+1|k} = \Phi_{k,k+1} P_{k|k} \Phi_{k,k+1}^T + Q_k \end{cases} \quad (29)$$

In the updating process, the state vector and the covariance matrix are updated from the measurement model.

$$\begin{cases} K_k = P_{k|k-1} H_k^T (H_k P_{k|k-1} H_k^T + R_k)^{-1} \\ x_{k|k} = x_{k|k+1} + K_k (z_k - H_k x_{k|k-1}) \\ P_{k|k} = (I - K_k H_k) P_{k|k-1} (I - K_k H_k)^T + R_k \end{cases} \quad (30)$$

wherein, $K_k$ is referred to as Kalman gain.

b. AKF Filter

The KF filter is implemented as the smooth filter to smooth the CFP solution. In KF, for superior operation while turning and moving straightly, it is important to tune the covariance matrix $Q_k$ of the process noise. While turning, $Q_k$ is set to a relative large value to cover the dynamic change of the turning so as to ensure the KF convergence. While moving straightly, $Q_k$ is set to a relative small value to ensure the smoothness of the solution. The KF that adaptively sets $Q_k$ is usually referred to as the adaptive KF, i.e., AKF. $Q_k$ in AKF is defined as follows:

$$Q_k = \text{norm}(v_{int\ k}, v_{int\ k-1}) \cdot Q_{k,k} \quad (31)$$

wherein, $Q_{k,s}$ is the setting of $Q_k$ for the straight moving case, and $v_{int k}$ and $v_{int-1}$ are velocities at the k moment and k-1 moment given by the integration filter. Finally, no matter it is implemented as KF or AKF, the smooth filter outputs wireless smoothed constrained fingerprinting (SCFP) solution for the integration.

The experiment Verification

One embodiment is selected from a plurality of embodiments in the invention for experiment. In this embodiment, the shape of the search area in the search area determining module 132 is preset as rectangle. The fingerprint matching method of the data matching unit 14 uses single-point deterministic matching (2-norm) for fingerprint matching, the smooth filter 32 uses KF, INS/PDR/MC as the MEMS navigation solution, the integration filter 31 uses the EKF filter, and takes WiFi fingerprint as the representative of the wireless fingerprint. The target to be detected constituted by a complete inertia unit, a three-axis gyroscope and a three-axis accelerometer (MPU-6050 from Invensense company) and WiFi/BLUETOOTH® wireless technology standard combination module (AW-HN665 from Haihua Technology) is used to record a great amount of trajectory data.

The invention uses the experiment 1 and the experiment 2, i.e., by means of two trajectorys, to compare the navigation method MEMS/SCFP used in the integrated navigation method of the invention and the positioning methods in the existing technology. The existing MEMS standalone navigation technology and the integrated positioning methods are compared, for example MEMS, MEMS/FP, MEMS/CFP; and the wireless fingerprinting solution of the proposed technology, for example SCFP is compared with FP and CFP. The experiment environment is a 120×40 square meters room, in which the average number of visible WiFi RSS is 24; and WiFi wireless signal map database construction and maintenance are performed before obtaining the trajectory.

Figure 2:
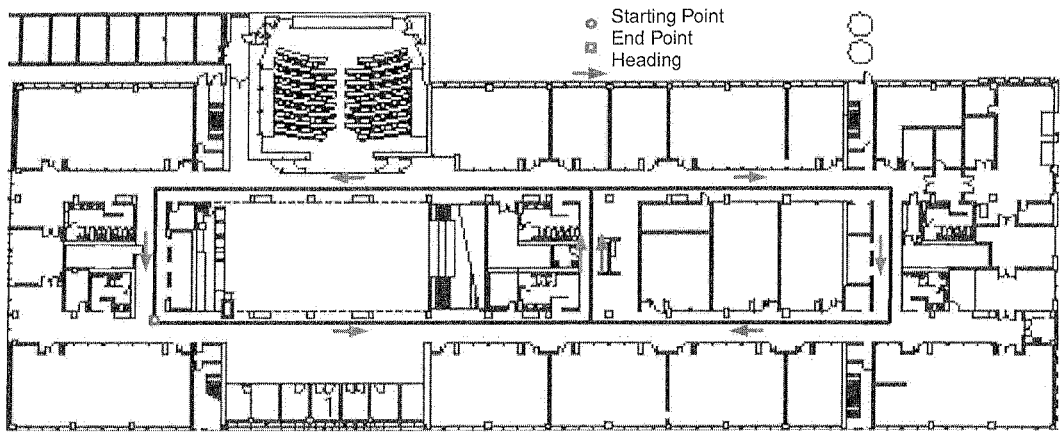
FIG. 2 is a schematic diagram of an experimental region and a trajectory I of an experiment 1 used for comparing between the invention and the existing technology.
Figure 3A:
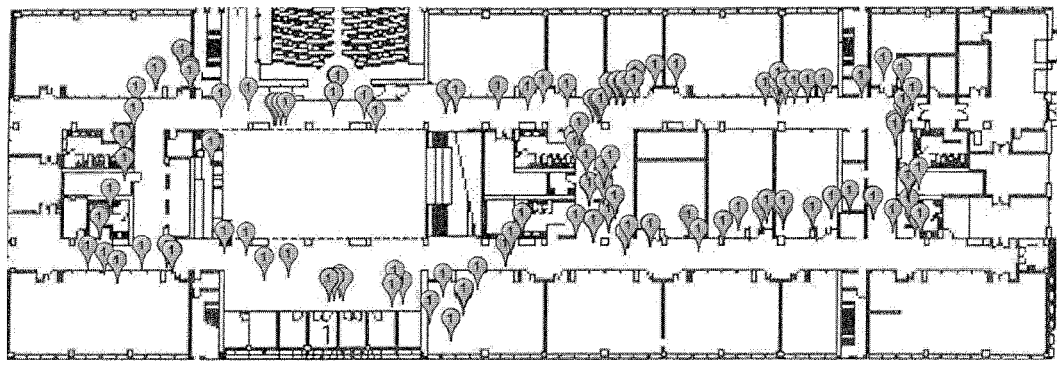
FIG. 3 is a positioning result comparative diagram for comparing wireless fingerprinting between the invention and the existing technology in the experiment 1, FIGS. 3(a), (b) and (c) are respectively positioning trajectory diagrams of FP, CFP and SCFP.
FIG. 3(d) is a positioning error comparative diagram.
Figure 3B:
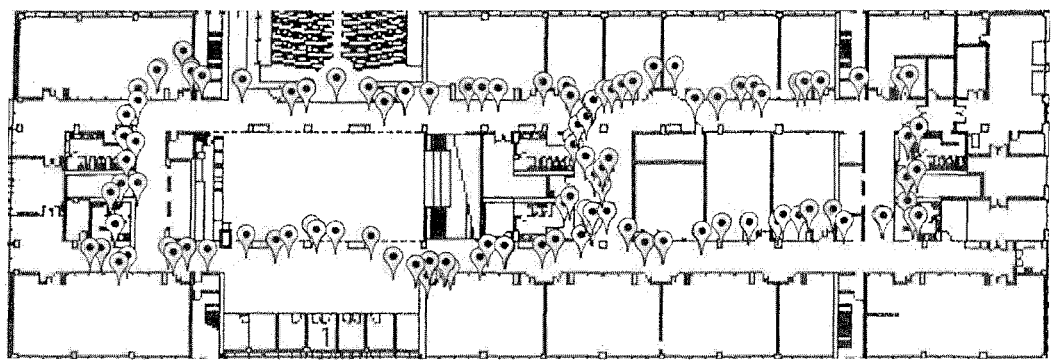
Figure 3C:
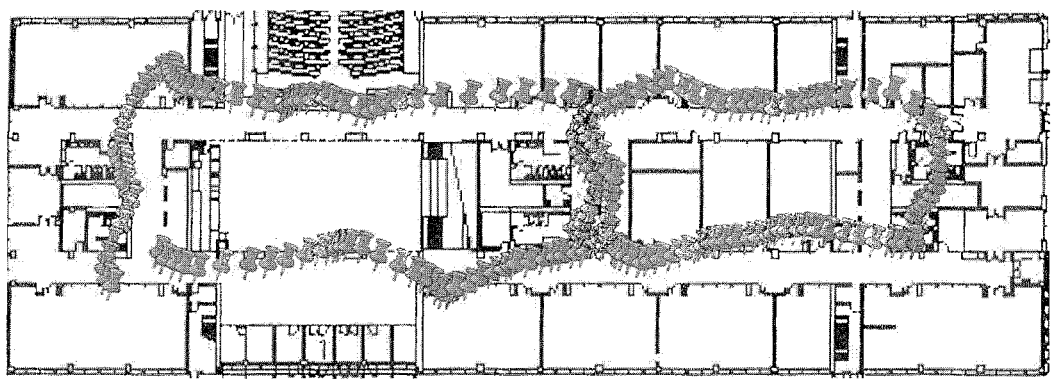
Figure 3D:
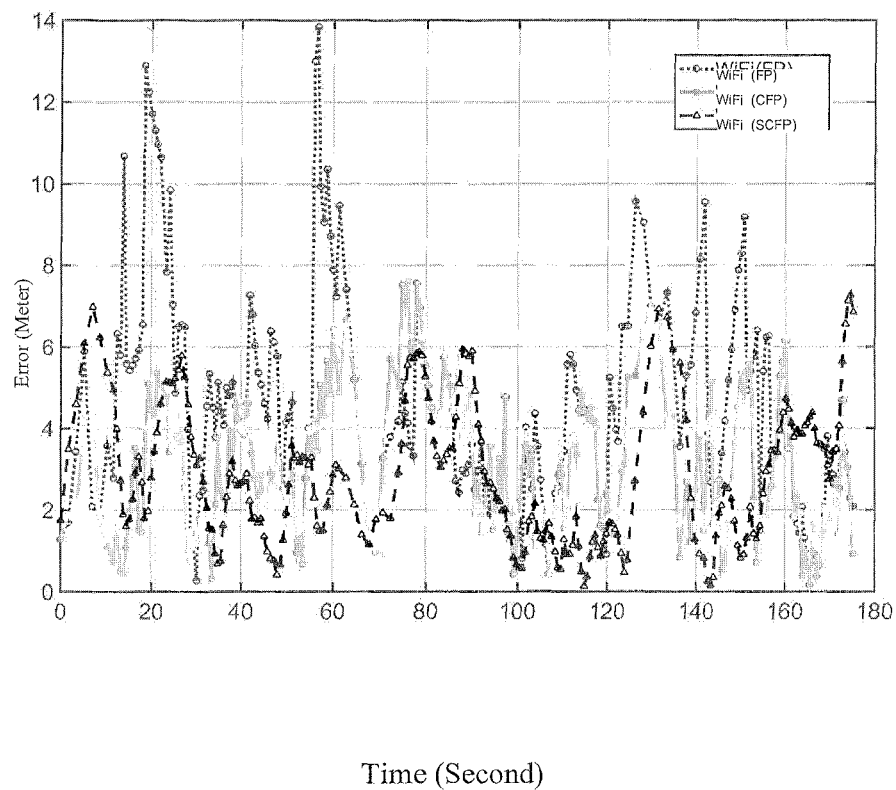
Figure 4A:
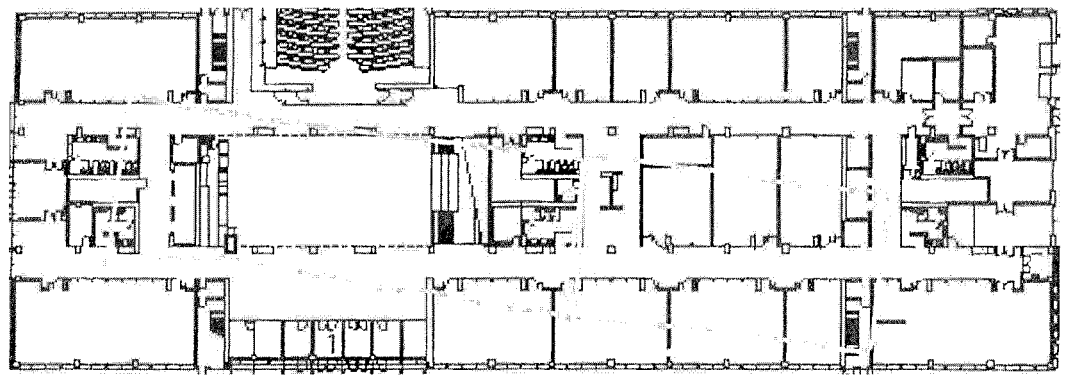
FIG. 4 is a positioning result comparative diagram for comparing MEMS independently positioning solution and integrated positioning solutions between the invention and the existing technology in the experiment 1, FIGS. 4(a), (b), (c) and (d) are respectively positioning trajectory diagrams of MEMS, MEMS/FP, MEMS/CFP and MEMS/SCFP.
FIG. 4(e) is a positioning error comparative diagram.
Figure 4B:
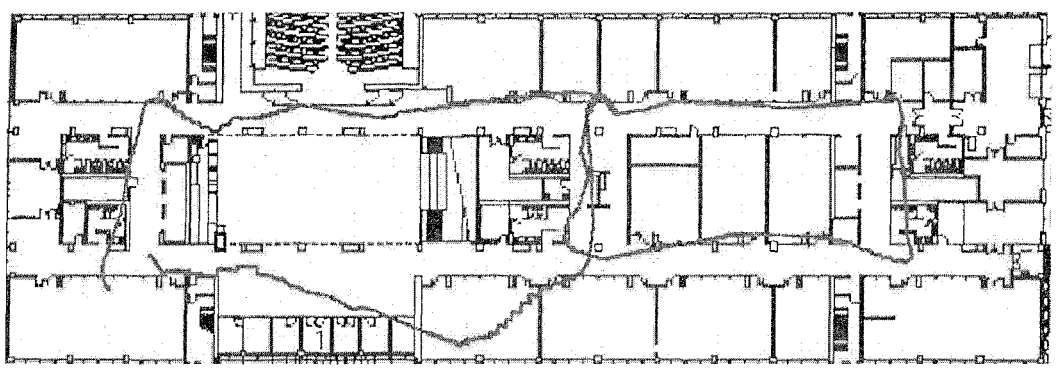
Figure 4C:
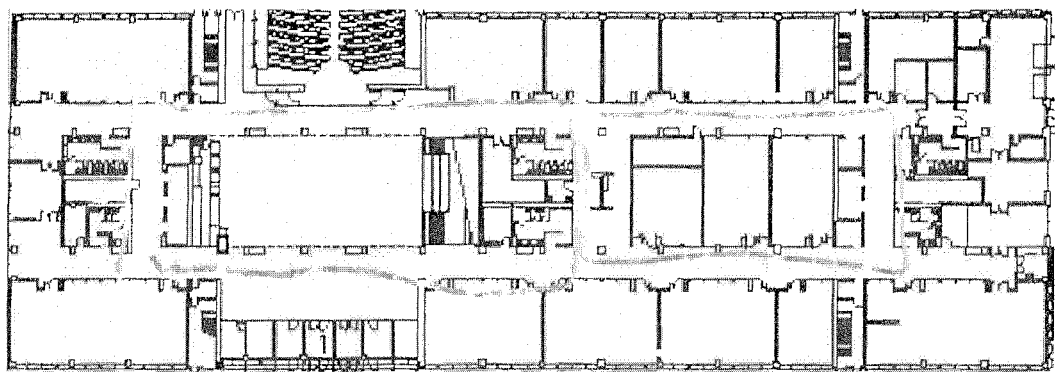
Figure 4D:
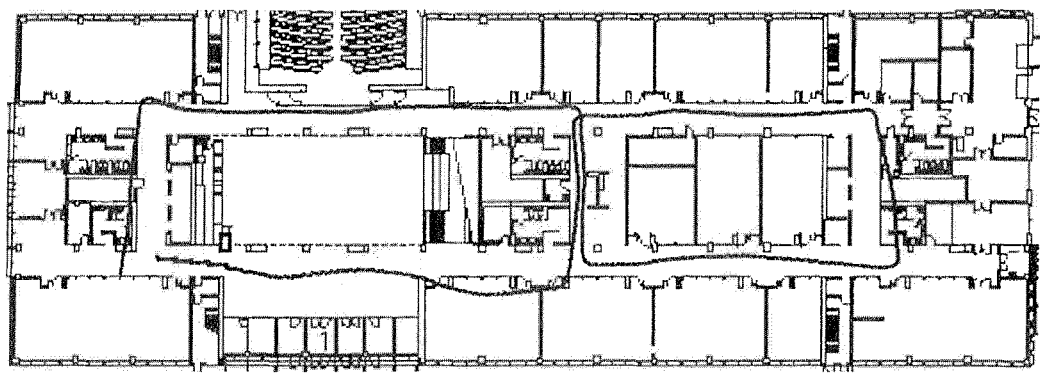
Figure 4E:
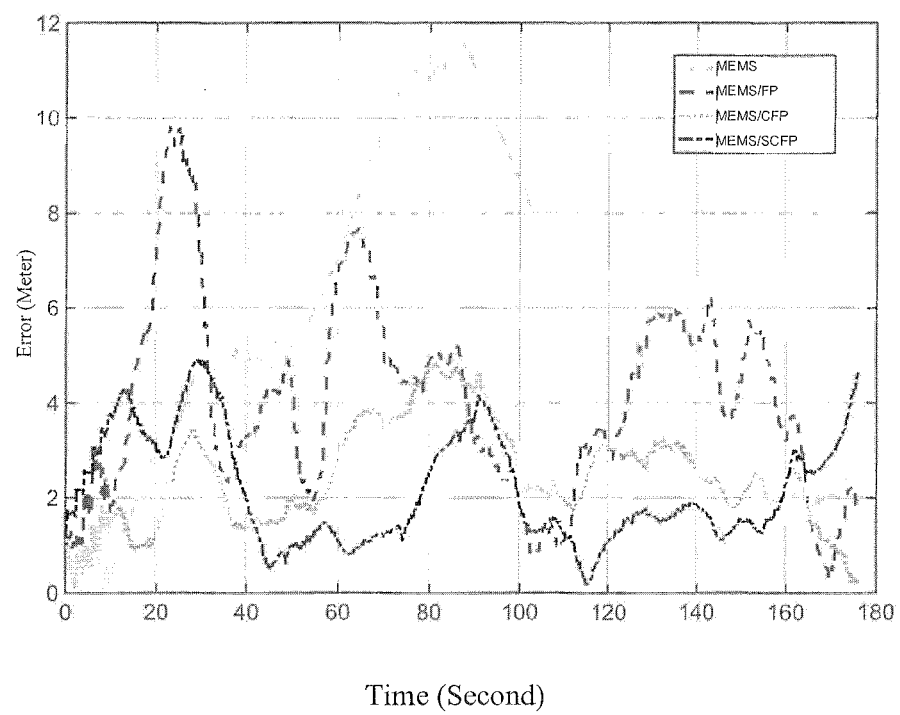
Figure 5:
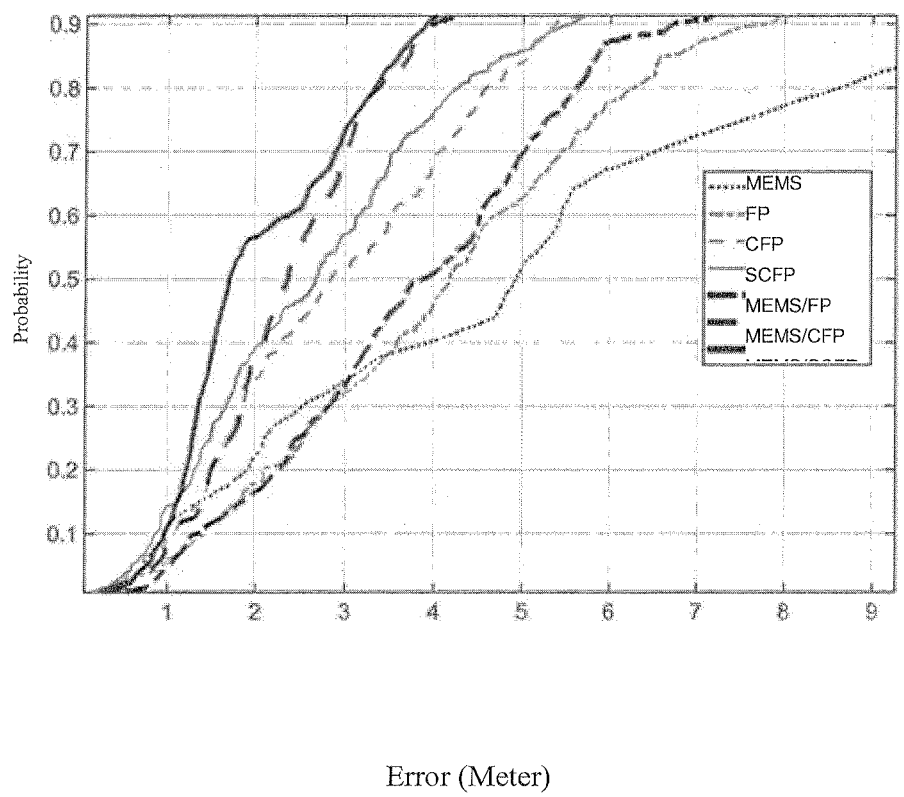
FIG. 5 is a positioning error cumulative distribution function comparative diagram of the wireless fingerprinting, MEMS independent positioning solution and integrated positioning solutions between the invention and the existing technology in the experiment 1.

As shown in FIG. 2, the walking trajectory shape in the experiment 1 is an "8" shape. The positioning result of the experiment 1 is shown in FIGS. 3 and 4. FIG. 3 shows an estimated trajectory and positioning error of FP, CFP and SCFP. FIGS. 3(a), (b) and (c) show that the number of hop points of CFP and SUP in the trajectory I are less than those of FP. As shown in FIG. 3(d), the positioning error of SCFP is better than that of CFP and much better than that of FP. As can be seen from FIG. 3, the WiFi positioning method SCFP disclosed in the invention is better than other methods. FIG. 4 shows the positioning trajectory and positioning error of MEMS, MEMS/FP, MEMS/CFP and MEMS/SCFP. In FIGS. 4(a), (b), (c) and (d), the trajectories of MEMS/CFP and MEMS/SCFP is closer to the reference value than MEMS and MEMS/FP. It also represents that MEMS has time drift and the worst positioning performance. FIG. 4(e) describes that MEMS/SCFP has the best performance among all the methods. With the help of wireless positioning, the integrated solution reduces the drift of the MEMS navigation solution. In conjunction with FIGS. 3 and 4, it can be seen that compared with other positioning solutions, the integrated solution is smoother and has a higher sampling rate. FIG. 5 shows the positioning error cumulative distribution function (CDF) of the trajectory I. As can be seen from FIG. 5, it can be seen that MEMS/SCFP disclosed in the invention provides a better result than MEMS/FP or MEMS/CFP, moreover, the result of SCFP is more accurate than that of CFP and FP.

Figure 6:
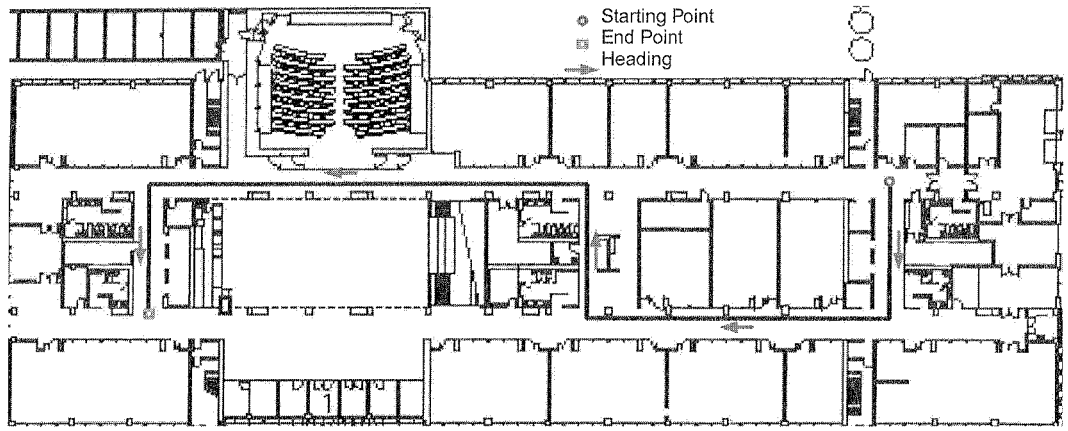
FIG. 6 is a schematic diagram of an experimental region and a trajectory 11 of an experiment 2 used for comparing the invention and the existing technology.
Figure 7A:
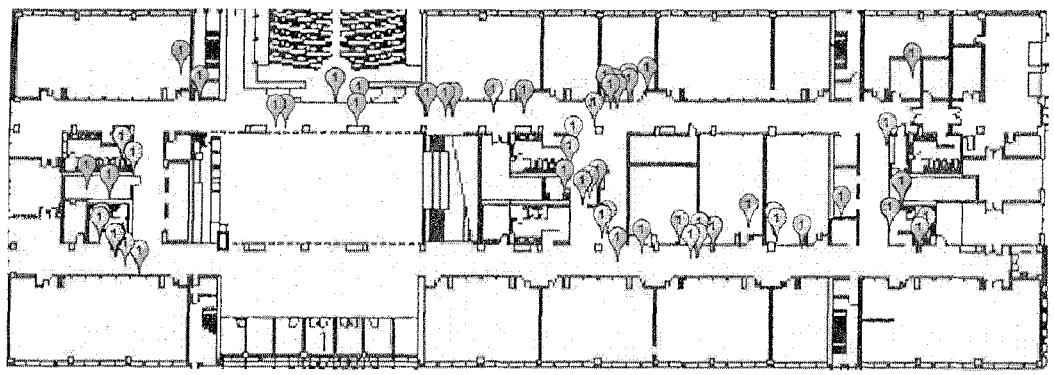
FIG. 7 is a positioning result comparative diagram for comparing wireless fingerprinting between the invention and the existing technology in the experiment 2, FIGS. 7(a), (b) and (c) are respectively positioning trajectory diagrams of FP, CFP and SCFP.
FIG. 7(d) is a positioning error comparative diagram.
Figure 7B:
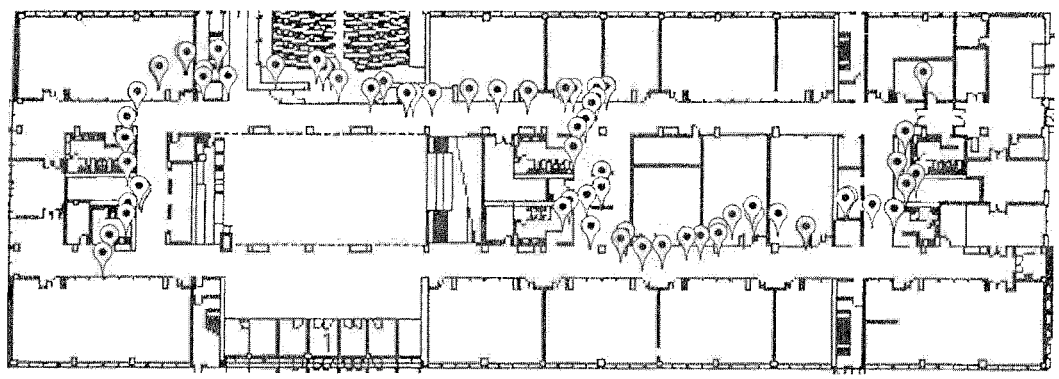
Figure 7C:
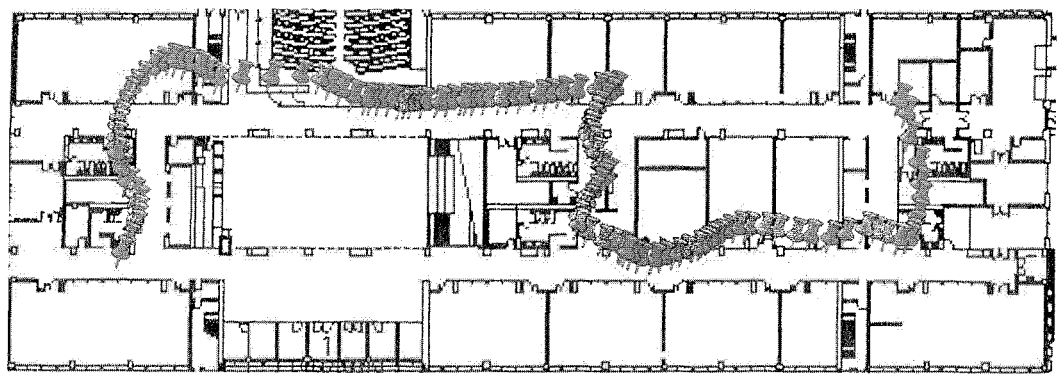
Figure 7D:
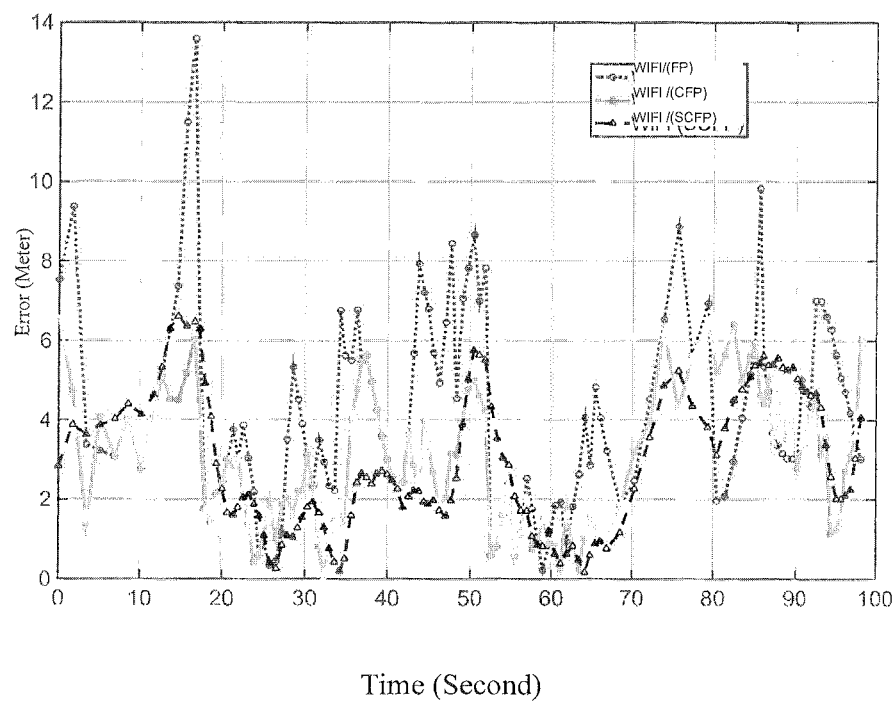
Figure 8A:
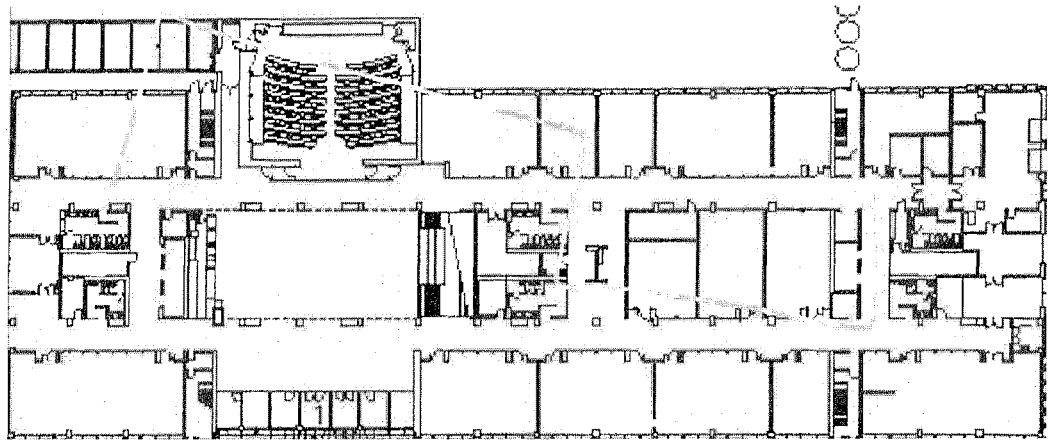
FIG. 8 is a positioning result comparative diagram for comparing MEMS independent positioning solution and integrated positioning solutions between the invention and the existing technology in the experiment 2, FIGS. 8(a), (b), (c) and (d) are respectively positioning trajectory diagrams of MEMS, MEMS/FP, MEMS/CFP and MEMS/SCFP.
FIG. 8(e) is a positioning error comparative diagram.
Figure 8B:
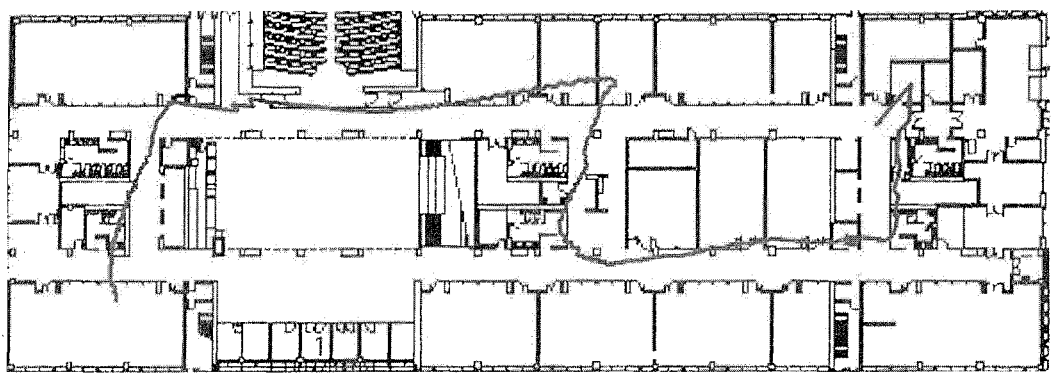
Figure 8C:
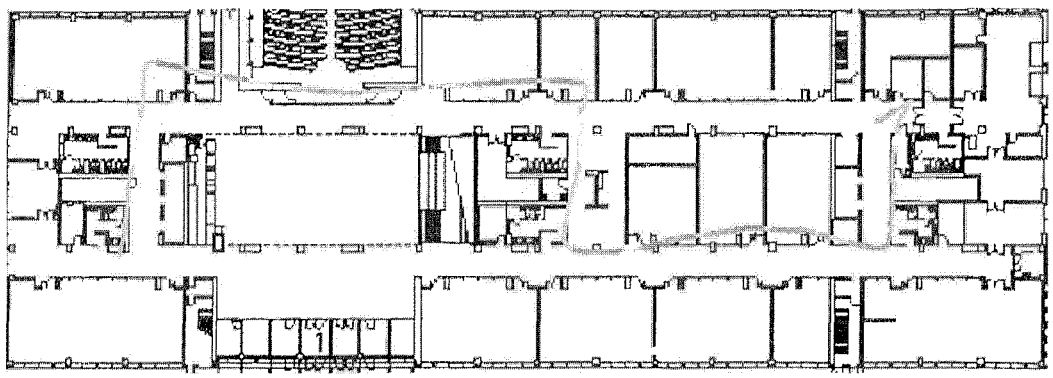
Figure 8:
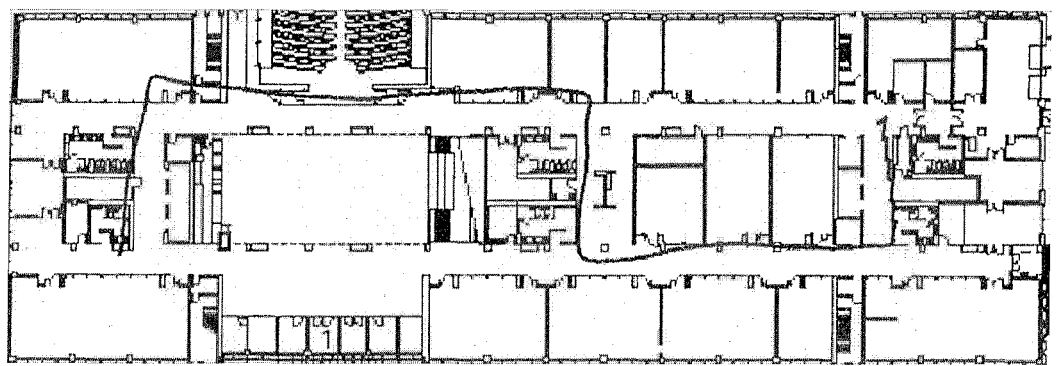
Figure 8E:
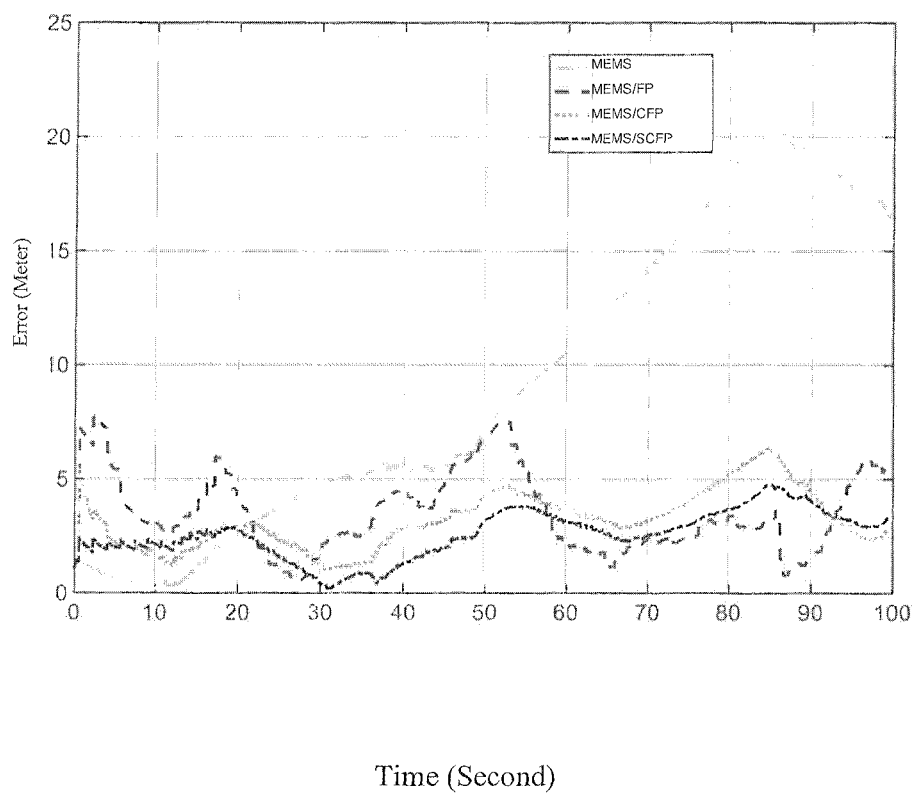
Figure 9:
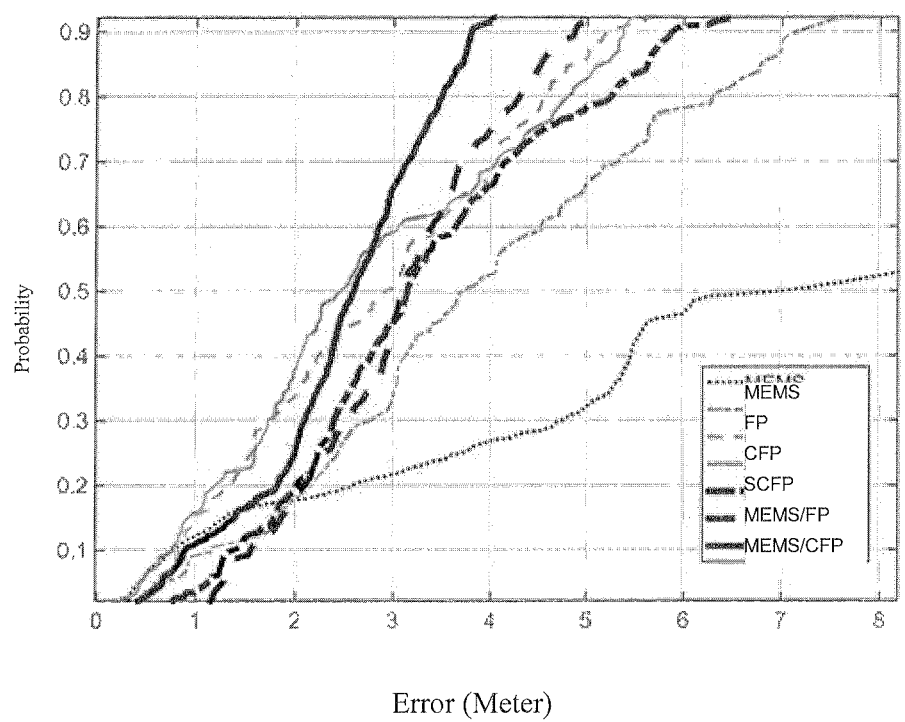
FIG. 9 is a positioning error cumulative distribution function comparative diagram of the wireless fingerprinting, MEMS independent positioning solution and integrated positioning solutions between the invention and the existing technology in the experiment 2.

As shown in FIG. 6, the walking trajectory shape in the experiment 2 is an "s" shape. The positioning result of the experiment 2 is shown in FIGS. 7 and 8. FIG. 7 shows the estimated trajectory and positioning error of FP, CFP and SCFP, similar to the trajectory I; FIGS. 7(a), (b) and (c) show that the hop points of CFP and SCFP in the trajectory II are less than those of FP; and FIG. 7(d) shows that the positioning error of SCFP in the trajectory II is less than that of CFP and PF, which means that the indoor navigation method of the invention is better than other methods. FIG. 8 shows the positioning result of MEMS, MEMS/FP, MEMS/CFP and MEMS/SCFP of the second trajectory; FIGS. 8(a), (b), (c) and (d) illustrate that due to drifting, the MEMS navigation solution has the worst performance, and the MEMS/SCFP and MEMS/CFP solutions are closer to the reference value; and FIG. 8(e) describes that MEMS/SCFP has the least positioning error among all the methods. FIG. 9 shows the positioning error cumulative distribution function (CDF) of the trajectory II. As can be seen from FIG. 9, it can be seen that the navigation method based on the integration of wireless fingerprints and MEMS sensors (MEMS/SCFP) of the invention provides a better result than MEMS/FP or MEMS/CFP, and the result of SCFP is more accurate than that of CFP and FP.

Regarding the positioning error of the two trajectories, Table 1 summarizes the following statistical values: 50% error, 90% error, mean, and root mean square value (RMS). As can be seen from Table 1, the result of the MEMS/SCFP solution (RMS: 2.4 meters and 2.8 meters) disclosed in the invention is better than that of MEMS/FP (RMS: 4.5 meters and 3.9 meters) or MEMS/CFP (RMS: 2.7 meters and 3.4 meters). Moreover, for the two trajectories, the result of SCFP (RMS: 3.3 meters and 3.3 meters) is more accurate than that of CFP (RMS: 3.6 meters and 3.4 meters) and FP (RMS: 5.2 meters and 4.9 meters). Compared with MEMS/FP, for the trajectories I and II, the method disclosed in the invention can be used to reduce the integrated positioning error by 47% and 28%. In addition, the wireless positioning error using MEMS/SCFP is also reduced by 37% and 33%, respectively.

By limiting the search area, the method disclosed in the invention further improves the processing speed of fingerprinting and the final integration, and can greatly reduce the FP calculation load, especially when the wireless signal map database is large. Table 2 compares the Matlab processing times of the method disclosed in the invention and other methods. For the trajectories I and II, the processing time of the method disclosed in the invention is only 26% and 29% of that of MEMS/FP, respectively. Meanwhile, the processing time of SCFP is only 5% and 6% of that of FP. Such result indicates that the method disclosed in the invention has higher calculation efficiency. With the reduction of the processing time, the method and device disclosed in the invention are more suitable for real-time positioning applications in portable devices.

TABLE 1

Statistical Results of Positioning Errors (m)

| Trajectory | Error | A* | B | C | D | E | F | G |
|---|---|---|---|---|---|---|---|---|
| T1 | 50% | 4.9 | 4.1 | 2.8 | 2.7 | 3.8 | 2.4 | 1.7 |
|  | 90% | 10.7 | 7.8 | 5.4 | 5.5 | 6.7 | 4.0 | 3.9 |
|  | Mean | 5.1 | 4.5 | 3.1 | 2.9 | 4.0 | 2.5 | 2.2 |
|  | RMS | 6.1 | 5.2 | 3.6 | 3.3 | 4.5 | 2.7 | 2.4 |
| T2 | 50% | 7.0 | 3.8 | 3.0 | 2.5 | 3.1 | 3.1 | 2.6 |
|  | 90% | 18.7 | 7.2 | 5.2 | 5.3 | 5.9 | 4.9 | 3.8 |
|  | Mean | 9.1 | 4.2 | 3.0 | 2.9 | 3.5 | 3.2 | 2.6 |
|  | RMS | 11.2 | 4.9 | 3.4 | 3.3 | 3.9 | 3.4 | 2.8 |

A*: MEMS;
B: FP;
C: CFP;
D: SCFP;
E: MEMS/FP;
F: MEMS/CFP;
G: MEMS/SCFP

TABLE 2

Simulation (Matlab) Processing Time (s) of Different Methods

| Trajectory | A* | B | C | D | E | F |
|---|---|---|---|---|---|---|
| T1 | 182.4 | 9.4 | 9.5 | 241.1 | 63.2 | 69.5 |
| T2 | 100.2 | 5.8 | 5.9 | 130.5 | 37.2 | 41.1 |

*A: FP;
B: CFP;
C: SCFP;
D: MEMS/FP;
E: MEMS/CFP;
F: MEMS/SCFP.

The above contents are only considered as illustration of the invention. In addition, those skilled in the art can easily conceive of numerous modifications and changes, so that the invention is not limited to the specific structure and operation shown and described, and accordingly, all the appropriate modifications and equivalents are considered as falling within the scope of the claims of the invention.

The invention claimed is:

1. A navigation device based on the integration of wireless fingerprints and MEMS sensors, which comprises: a wireless signal intensity data collecting and processing module, a MEMS sensor data collecting and processing module, a data integration module and several wireless access points distributed in different positions; wherein the wireless signal intensity data collecting and processing module is adapted to obtain first position information of a target to be detected according to the wireless signal intensity between the target to be detected and the wireless access points; the MEMS sensor data collecting and processing module is adapted to obtain second position information of the target to be detected according to state change information of the target to be detected; and the data integration module is adapted to integrate the first position information and the second position information to obtain final position information of the target to be detected according to an integrated result, and feeds back the integrated result to the wireless signal intensity data collecting and processing module and the MEMS sensor data collecting and processing module.

2. The navigation device based on the integration of wireless fingerprints and MEMS sensors according to claim 1, wherein, the wireless signal intensity data collecting and processing module comprises: a wireless signal intensity data collecting unit, a wireless signal map database, a data searching determining unit and a data matching unit; wherein the wireless signal intensity data collecting unit is adapted to receive wireless signal intensity information between the target to be detected and wireless access points; the wireless signal map database is adapted to provide a wireless signal map database for the data searching determining unit; the data searching determining unit is adapted to select the fingerprint search area for the wireless fingerprint matching unit according to the wireless signal intensity information transmitted by the wireless signal intensity data collecting unit and the integration result of the previous moment fed back by the data integration module; and the data matching unit is adapted to perform fingerprint matching to the wireless signal intensity information of the target to be detected in the area of fingerprint searching to obtain first position information of the target to be detected at the current moment.

3. The navigation device based on the integration of wireless fingerprints and MEMS sensors according to claim 2, wherein, the wireless signal intensity data collecting unit comprises: a wireless signal intensity data receiving unit and a wireless signal intensity data preprocessing unit; the wireless signal intensity data receiving unit is adapted to receive wireless signal intensity information between the target to be detected and the wireless access points and transmits the information to the wireless signal intensity data preprocessing unit; and the wireless signal intensity data preprocessing unit is adapted to perform noise elimination to the wireless signal intensity information.

4. The navigation device based on the integration of wireless fingerprints and MEMS sensors according to claim 2, wherein, the data searching determining unit comprises a searching center determining module and a search area determining module; the searching center determining module is adapted to determine the center of the basic search area according to the wireless signal intensity data collecting unit and the wireless signal intensity information and the center is taken as the center for expanding the search area according to the integrated result of the previous moment fed back by the data integration module; the search area determining module is adapted to take the center of the basic search area as the geometric center and determines the basic search area according to the preset searching shape, takes the center of the expanded search area as the geometric center and determines the expanded search area according to the preset searching shape, and then combines the basic search area and the expanded search area according to the preset combining mode to obtain the fingerprint search area at the current moment.

5. The navigation de-ice based on the integration of wireless fingerprints and MEMS sensors according to claim 1, wherein, the MEMS sensor data collecting and processing module comprises: a MEMS sensor data collecting unit and a MEMS sensor data processing unit; the MEMS sensor data collecting unit is adapted to collect state change information of the target to be detected, and the MEMS sensor data processing unit is adapted to calculate second position information of the target to be detected according to the state change information.

6. The navigation device based on the integration of wireless fingerprints and MEMS sensors according to claim 5, wherein, the state data of the target to be detected refers to the acceleration and/or angular speed information of the target to be detected.

7. The navigation device based on the integration of wireless fingerprints and MEMS sensors according to claim 1, wherein, the data integration module comprises: a combination filter and a smooth filter; the smooth filter is adapted to perform smoothing to the first position information of the target to be detected and then transmits it to the combination filter; the combination filter is adapted to integrate the smoothed first position information being and the second position information of the target to be detected to obtain final position information of the target to be detected.

8. The navigation device based on the integration of wireless fingerprints and MEMS sensors according to claim 7, wherein, the combination filter is adapted to use an expanded Kalman filter, an unscented Kalman filter or a particle filter; and the smooth filter is adapted to use a Kalman filter or an adaptive Kalman filter.

9. A navigation device based on the integration of wireless fingerprints and MEMS sensors, which comprises: a wireless signal intensity data collecting and processing module, a MEMS sensor data collecting and processing module, a data integration module and several wireless access points distributed in different positions; wherein the wireless signal intensity data collecting and processing module is adapted to obtain first position information of a target to be detected according to the wireless signal intensity between the target to be detected and the wireless access points; the MEMS sensor data collecting and processing module is adapted to obtain second position information of the target to be detected according to state change information of the target to be detected; and the data integration module is adapted to integrate the first position information and the second position information to obtain final position information of the target to be detected according to an integrated result, and feeds back the integrated result to the wireless signal intensity data collecting and processing module and the MEMS sensor data collecting and processing module, according to claim 1, Wherein, the wireless signal intensity data collecting and processing module comprises: a wireless signal intensity data collecting unit, a wireless signal map database, a data searching determining unit and a data matching unit; wherein the wireless signal intensity data collecting unit is adapted to receive wireless signal intensity information between the target to be detected and wireless access points; the wireless signal map database is adapted to provide a wireless signal map database for the data searching determining unit; the data searching determining unit is adapted to select the fingerprint search area for the wireless fingerprint matching unit according to the wireless signal intensity information transmitted by the wireless signal intensity data collecting unit and the integration result of the previous moment fed back by the data integration module; and the data matching unit is adapted to perform fingerprint matching to the wireless signal intensity information of the target to be detected in the area of fingerprint searching to obtain first position information of the target to be detected at the current moment.

10. The navigation device based on the integration of wireless fingerprints and MEMS sensors according to claim 9, wherein, the wireless signal intensity data collecting unit comprises: a wireless signal intensity data receiving unit and a wireless signal intensity data preprocessing unit; the wireless signal intensity data receiving unit is adapted to receive wireless signal intensity information between the target to be detected and the wireless access points and transmits the information to the wireless signal intensity data preprocessing unit; and the wireless signal intensity data preprocessing unit is adapted to perform noise elimination to the wireless signal intensity information.

11. The navigation device based on the integration of wireless fingerprints and MEMS sensors according to claim 9, wherein, the data searching determining unit comprises a searching center determining module and a search area determining module; the searching center determining module is adapted to determine the center of the basic search area according to the wireless signal intensity data collecting unit and the wireless signal intensity information and the center is taken as the center for expanding the search area according to the integrated result of the previous moment fed back by the data integration module; the search area determining module is adapted to take the center of the basic search area as the geometric center and determines the basic search area according to the preset searching shape, takes the center of the expanded search area as the geometric center and determines the expanded search area according to the preset searching shape, and then combines the basic search area and the expanded search area according to the preset combining mode to obtain the fingerprint search area at the current moment.

12. The navigation device based on the integration of wireless fingerprints and MEMS sensors according to claim 9, wherein, the MEMS sensor data collecting and processing module comprises: a MEMS sensor data collecting unit and a MEMS sensor data processing unit; the MEMS sensor data collecting unit is adapted to collect state change information of the target to be detected, and the MEMS sensor data processing unit is adapted to calculate second position information of the target to be detected according to the state change information.

13. The navigation device based on the integration of wireless fingerprints and MEMS sensors according to claim 12, wherein, the state data of the target to be detected refers to the acceleration and/or angular speed information of the target to be detected.

14. A navigation method based on the integration of wireless fingerprints and MEMS sensors, wherein:
   the wireless signal intensity data collecting and processing module obtains first position information of a target to be detected according to wireless signal intensity information between the target to be detected and wireless access points;
   the MEMS sensor data collecting and processing module obtains second position information of the target to be detected according to state change information of the target to be detected;
   the data integration module integrates the first position information and the second position information of the target to be detected to obtain final position information of the target to be detected according to the integrated result, and feeds back the integrated result to the wireless signal intensity data collecting and processing module and the MEMS sensor data collecting and processing module.

15. The navigation method based on the integration of wireless fingerprints and MEMS sensors according to claim 14, wherein, the wireless signal intensity data collecting and processing module obtains the first position information of the target to be detected, which includes the following steps:

performing position information sampling in a positioning region, generating and storing wireless fingerprints from position information of a sampling point and the wireless signal intensity information between the sampling point and the wireless access points, and constructing a wireless signal map database using the wireless fingerprints;

taking the wireless signal intensity information between the target to be detected and the wireless access points as the center, determining the basic search area at the current a moment by a preset searching shape, taking the integration result of the previous moment as the center of the expanded search area, determining the expanded search area at the current moment by the preset searching shape, and then combining the basic search area and the expanded search area according to a preset combining mode to obtain the fingerprint search area at the current moment; and performing fingerprint matching to the wireless signal intensity information of the target to be detected in the fingerprint search area to obtain a first position information of the target to be detected at the current moment.

16. A navigation device based on the integration of wireless fingerprints and MEMS sensors, which comprises: a wireless signal intensity data collecting and processing module, a MEMS sensor data collecting and processing module, a data integration module and several wireless access points distributed in different positions; wherein the wireless signal intensity data collecting and processing module is adapted to obtain first position information of a target to be detected according to the wireless signal intensity between the target to be detected and the wireless access points; the MEMS sensor data collecting and processing module is adapted to obtain second position information of the target to be detected according to state change information of the target to be detected; and the data integration module is adapted to integrate the first position information and the second position information to obtain final position information of the target to be detected according to an integrated result, and feeds back the integrated result to the wireless signal intensity data collecting and processing module and the MEMS sensor data collecting and processing module wherein, the data integration module comprises: a combination filter and a smooth filter; the smooth filter is adapted to perform smoothing to the first position information of the target to be detected and then transmits it to the combination filter; the combination filter is adapted to integrate the smoothed first position information being and the second position information of the target to be detected to obtain final position information of the target to be detected.

17. The navigation device based on the integration of wireless fingerprints and MEMS sensors according to claim 16, wherein, the combination filter is adapted to use an expanded Kalman filter, an unscented Kalman filter or a particle filter; and the smooth filter is adapted to use a Kalman filter or an adaptive Kalman filter.

18. A navigation method based on the integration of wireless fingerprints and MEMS sensors, wherein:

the wireless signal intensity data collecting and processing module obtains first position information of a target to be detected according to wireless signal intensity information between the target to be detected and wireless access points;

the MEMS sensor data collecting and processing module obtains second position information of the target to be detected according to state change information of the target to be detected; and the data integration module integrates the first position information and the second position information of the target to be detected to obtain final position information of the target to be detected according to the integrated result, and feeds back the integrated result to the wireless signal intensity data collecting and processing module and the MEMS sensor data collecting and processing module, wherein, the wireless signal intensity data collecting and processing module obtains the first position information of the target to be detected, which includes the following steps:

performing position information sampling in a positioning region, generating and storing wireless fingerprints from position information of a sampling point and the wireless signal intensity information between the sampling point and the wireless access points, and constructing a wireless signal map database using the wireless fingerprints;

taking the wireless signal intensity information between the target to be detected and the wireless access points as the center, determining the basic search area at the current moment by a preset searching shape, taking the integration result of the previous moment as the center of the expanded search area, determining the expanded search area at the current moment by the preset searching shape, and then combining the basic search area and the expanded search area according to a preset combining mode to obtain the fingerprint search area at the current moment and—therefor performing fingerprint matching to the wireless signal intensity information of the target to be detected in the fingerprint search area to obtain a first position information of the target to be detected at the current moment.

\* \* \* \* \*